United States Patent [19]

Romanowski

[11] 4,068,044

[45] Jan. 10, 1978

[54] METHOD FOR MECHANICALLY RECHARGING, REFUELING A METAL HALIDE ENERGY SYSTEM

[75] Inventor: Edward A. Romanowski, Troy, Mich.

[73] Assignee: Energy Development Associates, Madison Heights, Mich.

[21] Appl. No.: 200,072

[22] Filed: Nov. 18, 1971

[51] Int. Cl.² .................. H01M 4/62; H01M 8/00
[52] U.S. Cl. ........................................ 429/27
[58] Field of Search .......... 136/120, 120 FC, 86 D; 429/27

[56] References Cited

U.S. PATENT DOCUMENTS

| | | | |
|---|---|---|---|
| 3,060,254 | 10/1962 | Arry | 136/120 R |
| 3,181,973 | 5/1965 | Duddy | 136/120 FC |
| 3,184,339 | 5/1965 | Ellis | 136/120 R |
| 3,271,195 | 9/1966 | Berchielli et al. | 136/120 R |
| 3,316,126 | 4/1967 | Leduc | 136/86 A |
| 3,531,328 | 9/1970 | Bro et al. | 136/120 R |

Primary Examiner—John H. Mack
Assistant Examiner—H. A. Feeley
Attorney, Agent, or Firm—Ostrolenk, Faber, Gerb & Soffen

[57] ABSTRACT

An electrode for use in an electrical energy storage device containing an aqueous metal halide electrolyte comprised of a surface on the electrode containing an electrolyte soluble binder with metallic particles contained therein so that during discharge the metal will be exposed as the binder dissolves, thereby allowing the metal to participate in the electrochemical reaction.

6 Claims, 3 Drawing Figures

METHOD FOR MECHANICALLY RECHARGING, REFUELING A METAL HALIDE ENERGY SYSTEM

BACKGROUND OF THE INVENTION

High energy density batteries are generally those that produce 50 watt hours per pound. Recently, there has been a breakthrough in high energy density batteries by utilization of a halogen hydrate battery as is described in U.S. Ser. No. 50,054 filed June 26, 1970 now U.S. Pat. No. 3,713,888.

The preferred embodiment of the halogen hydrate battery is directed to a recharging type of apparatus. On some occasions, it is desirable to have an alternative to electrolytic recharging whereby the metallic portion of the battery system is introduced by some means such as mechanical means. Alternative methods of producing electrodes have been described in such references as U.S. Pat. No. 3,392,057 wherein zinc particles are included in the resin in order to permit long shelf-life of the electrodes. Sometimes, a polymer is applied to the electrode in order to extend the shelf-life independent of utilization of the metallic particles present. See U.S. Pat. No. 2,942,050. Canadian Pat. No. 568,875 likewise describes an electrode which is substantially a metallic electrode with a small proportion of a thermoplastic binder. This permits uniform service life of the batteries, and prevents early failure of the batteries prior to complete utilization of the anode metal. Another reference which employs metallic particles as a source of electrochemically reactive material is that described in U.S. Pat. No. 2,592,698.

In general, the systems described above do not teach that they may be applicable in an aqueous metal halide electrolyte such as zinc chloride. When zinc chloride electrolyte is employed, a corrosive electrolyte is present. In addition, in order to effect discharge, chlorine would be used as the source of the halide and accordingly, therefore, aqueous solutions containing chlorine, are corrosive. Therefore, one must find a means for introducing metal particles in such a highly corrosive environment.

It is an object of the present invention to provide an electrode which is applicable in highly corrosive environments.

It is a further object of the present invention to provide an electrode which can be slowly solubilized in a highly corrosive environment.

SUMMARY OF THE INVENTION

An electrode is described for use in an aqueous metal halide electrolyte wherein metallic particles are contained in a soluble material, such as, a polymeric resin so that as the aqueous metal halide electrolyte passes or flows by the electrode surface, the resinous material will solubilize, thereby making the metal available for electrochemical reaction on discharge.

DESCRIPTION OF PREFERRED EMBODIMENTS

The electrode of the present invention is applicable to an electrical energy storage device or battery which employs an aqueous metal halide electrolyte. Normally, the halogen is converted to a halide while the metal is converted to the metal ions, thereby generating an electrical current. The source of the halogen may be halogen hydrates such as that described in the aforementioned U.S. Ser. No. 50,054 now U.S. Pat. No. 3,713,888 or liquid bromine as is described in U.S. Pat. No. 3,408,322. The halogen may be produced chemically and introduced into a storage area which would then make it available for discharge. In other words, the source of the halogen can be from any means which generates a halogen which would then be available for discharge employing the electrode of the present invention. When employing halogen hydrate as a source of halogen, during discharge of the battery, the electrolyte may be contained in a reservoir which is circulated to the electrode area by means of a pump. The halogen hydrate decomposes to halogen and water which halogen is entrained in the solution. This solution is introduced into the electrode area whereby the halogen becomes ionized and is, therefore, available for electrochemical reaction. Halogen is replenished for introduction into the electrode area by a circulation of the electrolyte from the electrode area to the storage area when employing a halogen hydrate battery.

The electrodes of the present invention are comprised of an electrode surface on which a metal is contained in a binder which is soluble in the electrolyte, substantially inert, and which gradually erodes away during the discharge reaction by the flow of the electrolyte pass the electrolyte surface, thereby making the metal exposed and permitting it to participate in the electrochemical reaction on discharge. A preferred binder is an electrolyte soluble resinous material which is slightly soluble.

While the electrodes can be comprised of resinous material and metallic particles in its entirety, a preferred means of operation is where the resinous material and metallic particles are placed on to a carrier which is likewise inert to the corrosive environment of the electrolyte.

The material that can be employed as the carrier or the backbone for the mixture of metallic particles and resinous material is any material that is inert to the environment such as graphite or carbon. Other carriers may be employed such as a metallic carrier providing the mixture is adherent to the metallic carrier and the carrier is reasonably inert in the environment.

The invention is graphically described by reference to the drawings.

Figure 1:
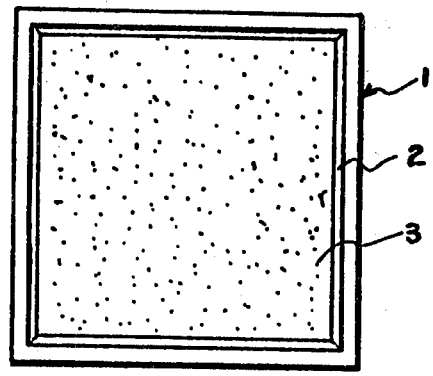
Figure 2:
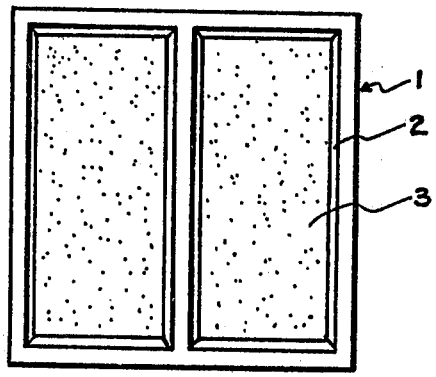
Figure 3:
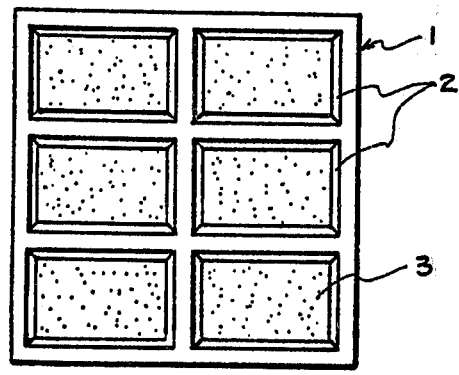

FIGS. 1, 2, and 3 are front views of electrodes whereby portions of the carrier have been removed or grooved for insertion of the metal and binder.

The metal that may be employed in the present application is generally the same metal as the aqueous metal halide electrolyte although this is not a pre-requisite. The metal halide electrolyte is an aqueous solution containing from 0.1% up to a saturated concentration of a metal halide consisting of metals selected from the group consisting of Group VIII of the Periodic Chart (namely: iron, cobalt, nickel, ruthenium, rhodium, palladium, osmium, iridium, platinum), metals of the Lanthanum Series (namely: Ce, Pr, Nd, Pm, Sm, Eu, Gd, Tb, Dy, Ho, Er, Tm, Yb, and Lu) and Actinium Series (namely: Th, Pa, U, Nt, Pu, Am, Cm, Bk, and Cf) in addition to Zn, Sc, Ti, V, Cr, Mn, Cu, Ga, Y, Zr, Nb, Mo, Tc, Ru, Rh, Pd, Ag, Cd, In, Sn, Hf, Ta, W, Au, Hg, Tl, Pb, Bi, Na, Li, K, and the like. Of the foregoing metals, zinc and aluminum constitutes the most preferred metals, while iron, cobalt, and nickel are preferred to the remaining innumerated materials. Zinc is the most preferred.

The metallic particles that are present in the resinous material generally have a particle size ranging from about 0.01 microns to 100 microns, preferably, 0.1 to 20 microns, and even more preferably from 1 to about 10 microns. The larger the particle size of the metallic particles, the greater the tendency of the metal to stratify within the polymer matrix and, thereby making discharge somewhat erratic. The small particle size tends to give a uniform, flat discharge. The amount of metallic particles that is present in the resinous material is dependent upon the amount of reactivity one wishes to introduce into such a system. For example, if the source of halogen is periodically replaced by a chemical means then sufficient metallic particles may be introduced into the electrode of the present invention for discharge over a long period of time. The volume of the electrode of the present invention is quite small compared to the volume of a halogen hydrate storage area. Acccordingly, therefore, four or five rechargings of halogen hydrate may take place while it may be necessary to replace only once the metal electrodes of the present invention. By "recharging" is meant the replenishment of halogen hydrate by any means. This may take the form of chemically producing halogen hydrate and introducing it into the storage area. The electrodes are preferably employed in a "refuelable" or mechanically "rechargeable" battery as is described in U.S.S.N. 200,070, now abandoned, filed on even date herewith, titled "Refuelable Battery". By "rechargeable" or "refuelable" is meant that the active components of the battery, i.e., the halogen hydrate and the oxidizable metal are inserted into the battery by chemical or mechanical means other than by electrolytically charging, i.e., passing a current through a metal halide solution, depositing metal on one electrode, forming halogen at the other and storing the halogen as halogen hydrate.

The halogen hydrates that are employed are generally chlorine hydrate ($Cl_2 \cdot 8H_2O$) or bromine ($Br_2 \cdot 10H_2O$). Although iodine hydrate is known it is too unstable a material. See Russian Chemical Reviews, 37 (6), 1968, Pgs. 469–490.

The amount of metal that is present in the resin may range from about 0.5 grams to 200 grams of metal per gram of binder. Preferably, the ratio on a weight basis is about five to about ten grams of metallic particles per gram of binder.

The binder that may be employed in the present invention are those that are slightly soluble in the aqueous electrolyte so that they may slowly dissolve upon discharge thereby exposing the metallic particles for electrochemical reaction. A low molecular weight water soluble wax type resinous polymer is preferred. Examples of such wax type polymers are Carbowax (Union Carbide) which is a polyethylene glycol of 4,000 molecular weight. In addition, other polymer materials may be employed such as polypropylene glycol, or other poly lower alkylene glycols having a molecular weight from 1,000 to 100,000. Other polymer materials that may be employed are polydioxalane of a molecular weight from 1,000 to 100,000; polyvinyl alcohol of a molecular weight from 200 to 2,000; soluble polysaccharides such as cellulose, carboxy, methyl cellulose or hydroxy ethyl cellulose, wherein the polysaccharides have a molecular weight from 21,000 to 500,000; polyvinyl pyrrolidone having a molecular weight from about 100 to about 2,000; polyethyleneimine having a molecular weight of from 100 to 2,000 and the like.

As has been described above, the preferred embodiment is the utilization of a graphite electrode support or carrier with the metallic particles and resin introduced into the system. Generally, this can be accomplished by flowing the particles and resins into a heated support member or by flowing the resinous particles on to the support member and then baking the composite. Either way the polymeric material solidifies, thereby encasing the metal and adhering the entire mass to the support carrier.

Examples of support carriers that can be employed in the present invention are in FIGS. 1, 2, and 3. The support carrier can have an inner portion of it removed for placement of the resinous materials and metallic particles. (See FIG. 1.) An alternative method is by having a series of grooves in a solid support carrier. (See FIG. 2.) Lastly, a series of pockets can be employed giving a waffle-like effect. (See FIG. 3.) In FIG. 1, the support carrier (1) has the majority of its central portion removed, thereby having a recessed area (2) which is available for insertion of the mixture of metallic particles and resinous materials (3). In this situation, 50 to 90% of the electrode surface has been removed for insertion of the metal and binder.

FIG. 2 is similar to FIG. 1 except that there are a series of elongated grooves for insertion of the metallic particles and resinous materials. The grooves may be the length of the electrode surface and be about 4 to 10 times the width of the grooved area. Here also 50-90% of the electrode surface may be grooved.

FIG. 3 is similar to the other two figures except that a plurality of pockets for insertion of the metallic particles is made, thereby giving a waffle-like effect. FIG. 3 is a preferred embodiment since conduction throughout the support carrier is possible due to the conductive nature of this support design. The pockets may be square or rectangular each having an area of about 1.5 to 3 cm². This size would vary widely providing the waffle-like design is retained. The pockets preferably cover the entire surface of the electrode so that about 40 to 70% of the electrode surface has been removed and is filled with binder and metal.

The electrode of the present invention is also applicable in a system wherein the aqueous metal halide electrolyte is periodically replaced as the halogen hydrate is periodically replenished. For more details, see U.S. Ser. No. 200,070, now abandoned Refuelable Battery, filed on even date herewith.

To further illustrate the invention, the following specific example is provided, but it is to be understood that the examples are merely illustrative of various compositions and concentrations suitable for use in accordance with the practice of the present invention and are not intended to be limiting of the invention. All temperatures are in degrees centigrade and all weights are parts by weight, unless otherwise indicated.

EXAMPLE I

A mixture of 50 grams, 8 microns, zinc dust obtained from (ASARCO) and 7.5 grams polyethylene glycol 4,000 (Union Carbide) was spread unto a waffle design electrode of such as shown in FIG. 3. The electrode was then placed on a warm hot plate until the polymeric mixture was sufficiently molten to completely cover the front face of the electrode and also to wet the surface of the graphite, thus insuring electrical contact. The electrode is removed from the hot plate and the polymer allowed to harden. A cell was put together using porous

60 graphite as the chlorine electrode separated from the metal electrode by 0.05".

A 25% by weight zinc chloride electrolyte with chlorine entrained therein was flowed into the electrode area past the electrode surface at a rate of 400 mls/minute. A satisfactory discharge was achieved with this cell; steady state operation at 6.2 amps produced around 1.48 volts. This voltage was very uniform throughout the entire run. Three second, 30 amp bursts produced 0.75 to 0.60 volts. A total of 1700 amps was discharged from this plate to 0.75 volts which resulted in an efficiency of 70%.

What is claimed is:

1. An electrical energy storage device containing an electrode area with at least one negative electrode and one positive electrode with an aqueous metal halide electrolyte there between, means for passing a halogen into the electrode area whereby the halogen during discharge will be converted to halide ion, wherein the negative electrode comprises a surface containing an electrolyte soluble binder with zinc particles contained therein, so that during discharge the metal will be exposed as the binder dissolves in the aqueous metal halide electrolyte, thereby allowing the metal to participate in the electrochemical reaction by converting the metal to metal ion.

2. An electrical energy storage device containing an electrode area with at least one negative electrode and one positive electrode with an aqueous metal halide electrolyte therebetween, means for passing a halogen into the electrode area whereby the halogen during discharge will be converted to halide ion, wherein the negative electrode comprises a surface on the negative electrode containing an electrolyte soluble binder with metallic particles contained therein so that during discharge the metal will be exposed as the binder dissolves in the aqueous metal halide electrolyte thereby allowing the metal to participate in the electrochemical reaction by converting the metal to metal ion, and wherein the metallic particles and binder are present on a conductive support.

3. An electrical energy storage device containing an electrode area with at least one negative electrode and one positive electrode with an aqueous metal halide electrolyte therebetween, means for passing a halogen into the electrode area whereby the halogen during discharge will be converted to halide ion, and wherein the negative electrode comprises a surface containing an electrolyte soluble binder with metallic particles contained therein so that during discharge the metal will be exposed as the binder dissolves in the aqueous metal halide electrolyte thereby allowing the metal to participate in the electrochemical reaction by converting the metal to metal ion, and wherein the binder and metallic particles are present in an amount ranging from about 0.5 to 200 parts by weight of metallic particles to one part of binder.

4. An electrical energy storage device containing an electrode area with at least one negative electrode and one positive electrode with an aqueous metal halide electrolyte therebetween, means for passing a halogen into the electrode area whereby the halogen during discharge will be converted to halide ion, and wherein the negative electrode comprises a surface containing an electrolyte soluble binder with metallic particles ranging in size from about 0.01 to about 100 microns contained therein, so that during discharge the metal will be exposed as the binder dissolves in the aqueous metal halide electrolyte thereby allowing the metal to participate in the electrochemical reaction by converting the metal to metal ion.

5. The electrical energy storage device of claim 2 wherein the support has a groove in which the metallic particles and binder are placed.

6. The electrical energy storage device of claim 2 wherein the support has a plurality of pockets in which the metallic particles and binder are placed.

* * * * *